3,133,094
PRODUCTION OF ACYLAMINES
Otto Von Schickh, Ludwigshafen (Rhine), Germany, assignor to Badische Anilin- & Soda-Fabrik Aktiengesellschaft, Ludwigshafen (Rhine), Germany
No Drawing. Filed Jan. 9, 1962, Ser. No. 165,258
Claims priority, application Germany Jan. 12, 1961
6 Claims. (Cl. 260—404.5)

This invention relates to a process for the production of acylamines from alcohols or esters.

It is known that monohydric alcohols can be converted into the corresponding amines by means of ammonia. Diamines are obtained by causing ammonia or a mixture of ammonia and hydrogen to act on dihydric alcohols in the presence of hydrogenation or dehydrogenation catalysts. Aminations of this type can be carried out either in the gas phase or in the liquid phase. When higher alcohols are involved, however, the gas phase process becomes uneconomical by reason of side reactions, such as olefin formation, dehydrogenation reactions and resinification. The amines or diamines may then be converted into acylamines in a second step by reaction with one of the usual acylating agents such as acid chlorides or acid anhydrides.

It is an object of this invention to provide a single-stage process for the production of acylamines by reaction of monohydric or polyhydric primary and/or secondary alcohols with ammonia and carboxylic acid amides.

Another object of this invention is to provide a process for the production of acylamines by single-stage reaction of carboxylic acid esters derived from monohydric or polyhydric primary or secondary alcohols with ammonia and carboxylic acid amides.

It is a further object of this invention to provide a process by which higher alcohols or esters can be converted in good yields into acylamines in a single-stage reaction.

In accordance with this invention, the said objects and advantages are achieved by reacting at least one monohydric or polyhydric primary and/or secondary alcohol or at least one acyl compound thereof with ammonia and at least one carboxylic acid amide or at least one compound yielding the same under the reaction conditions, at temperatures between 200° and 400° C., preferably between 250° and 370° C. and pressures preferably between 20 and 250 atmospheres and especially between 80 and 200 atmospheres. The term "alcohols" as used in the present specification includes also aromatic hydroxy compounds.

Examples of suitable initial materials are monohydric primary or secondary aliphatic, cycloaliphatic and araliphatic alcohols as well as phenol and α- or β-naphthol, dihydric diprimary, disecondary or primary-secondary aliphatic and cycloaliphatic alcohols, trihydric or tetrahydric aliphatic alcohols with primary and/or secondary hydroxyl groups, aliphatic amino alcohols and ether alcohols both with primary hydroxyl groups. Further suitable initial materials include the esters of the abovementioned alcohols with aliphatic, aromatic, cycloaliphatic and araliphatic monocarboxylic acids.

Preferred initial materials are monohydric primary straight-chain or branched aliphatic alcohols with one to twenty carbon atoms, such as methanol, ethanol, n-propanol, n-butanol, 2-methylpropanol, n-amyl alcohol, 2-methylbutanol-(4), n-hexanol, n-heptanol, n-octanol, n-dodecanol, n-tridecanol, cetyl alcohol and stearyl alcohol; monohydric secondary straight-chain aliphatic and cycloaliphatic alcohols with three to eight carbon atoms and secondary cycloaliphatic alcohols with five to twelve carbon atoms, such as propanol-(2), butanol-(2), pentanol-(2), pentanol-(3), 2-methylbutanol-(3), cyclohexanol, cyclododecanol, 3-methylcyclohexanol and 4-ethylcyclohexanol; monohydric primary araliphatic alcohols, such as benzyl alcohol, β-phenylethyl alcohol and β-phenylpropyl alcohol as well as dihydric primary and secondary aliphatic and cycloaliphatic alcohols with two to fifteen carbon atoms, such as ethylene glycol, propanediol-(1,2), propanediol-(1,3), butanediol-(1,4), butanediol-(1,3), butanediol-(1,2), butanediol-(2,3), pentanediol-(1,5), pentanediol-(1,2), hexanediol-(1,6), heptanediol-(1,7), octanediol-(1,8), decanediol-(1,10), cyclohexanediol-(1,2) and cyclohexanediol-(1,3); trihydric and tetrahydric aliphatic alcohols with primary and/or secondary hydroxyl groups and three to eight carbon atoms, such as glycerol, butanetriol-(1,2,4), erythritol and pentaerythritol as well as monohydric aliphatic amino alcohols with primary hydroxyl groups and two to eight carbon atoms, such as ethanolamine, diethanolamine, propanolamine, dipropanolamine, butanolamine and dibutanolamine; aliphatic ether alcohols with primary hydroxyl groups and three to sixteen carbon atoms, such as ethylene glycol monoethyl ether, ethylene glycol monobutyl ether, ethylene glycol monomethyl ether, dimeric trimeric and tetrameric ethylene glycol, propanediol-(1,3) and butanediol-(1,4).

Further preferred initial materials are the above-mentioned alcohols esterified with monocarboxylic acids. The carboxylic acid may be an aliphatic straight-chain or branched monocarboxylic acid with two to twenty, especially with two to twelve, carbon atoms, such as acetic acid, propionic acid, butyric acid, isobutyric acid, caproic acid, α-ethylcaproic acid, caprylic acid, palmitic acid or stearic acid, an aromatic monocarboxylic acid, such as benzoic acid, o-, m-, or p-toluic acid, a cycloaliphatic monocarboxylic acid, such as hexahydrobenzoic acid, or an araliphatic monocarboxylic acid, such as phenylacetic acid or phenylpropionic acid.

The preferred carboxylic acid amides include amides of fatty acids with two to ten carbon atoms, such as acetamide, propionamide, butyramide and α-ethylcaprylamide, and also amides of benzenemonocarboxylic acids, such as benzamide and o-, m- or p-toluamide. Amides of cycloaliphatic monocarboxylic acids with six to eight carbon atoms, such as hexahydrobenzamide, and amides of araliphatic monocarboxylic acids, such as phenylacetamide and γ-phenylpropionamide, are also very suitable.

Instead of the said carboxylic acid amides, it is also possible to use substances which form carboxylic acid amides under the reaction conditions. Such substances include the ammonium salts and nitriles of monocarboxylic acids whose amides are enumerated above, for example the ammonium salt of acetic acid, propionic acid and benzoic acid, and acetonitrile, propionitrile and benzonitrile. Esters of the said monocarboxylic acids, especially those derived from alkanols with one to four carbon atoms, are converted into amides under the reaction conditions and therefore may be used instead of the amides. Examples of suitable esters are methyl benzoate, methyl acetate, n-butyl acetate, isopropyl butyrate and tert.-butyl caproate.

As a rule, the carboxylic acid amides are added to the reaction mixture in an amount which is from 1 to 25 times, preferably 5 to 15 times, the molar amount with reference to the alcohol or ester groups to be reacted.

The ammonia may be added to the reaction mixture in the form of an aqueous solution, for example of 5 to 35% by weight strength, in the liquefied condition or by forcing it in as a gas. Ammonia is advantageously added in an amount of up to ten times a molar excess with reference to the alcohol or ester groups to be reacted.

The reaction may be carried out with or without the use of inert solvents. Examples of suitable solvents are water and hydrocarbons, such as hexane, petroleum ether, benzene, toluene and xylene. The process may be carried out batchwise or continuously.

The reactants are heated in a pressure vessel to temperatures between 200° and 400° C., preferably between 250° and 370° C. The pressure set up during this operation depends on the temperature, the size of the reaction vessel, the boiling temperature, the amount of reactants used and the solvent, if any. As a rule, the pressure is between 20 and 250 atmospheres, preferably between 80 and 200 atmospheres. A higher pressure may be set up forcing in inert gas, such as nitrogen. The reaction period is between 10 and 20 hours, as a rule. When the reaction has ended, the reaction mixture is allowed to cool and the pressure is released from the reaction vessel. Any excess carboxylic acid amide and any solvent are then distilled off, and the residue is purified by recrystallization.

It has proved to be an advantage to return the carboxylic acid amide which has already been used to the reaction vessel. The yield can be further increased in this way.

The compounds prepared according to the invention may be used as intermediates for the production of polyamides. For example, by fusing the diacylamines with dicarboxylic acids, the corresponding polyamides may be prepared.

By alkaline or acid saponification of the products of the process according to this invention, the free amines or the corresponding ammonium salts are obtained.

The invention will be further illustrated by, but is not limited to, the following examples. The parts are by weight, and the yields relate to the alcohol or carboxylic acid ester used.

*Example 1*

25 parts of hexanediol diacetate-(1,6) is heated with 177 parts of acetamide and 100 parts of concentrated aqueous ammonia for 15 hours in a pressure vessel at 300° C., a pressure of 100 atmospheres being set up. The excess acetamide is distilled off, and the residue recrystallized from ethyl acetate. 21 parts of N,N'-diacetylhexamethylenediamine-(1,6) having the melting point 126° C. is obtained. This is a yield of 84.7% of the theory.

The following compounds are obtained in an analogous manner:

Dipropionylhexamethylenediamine of the melting point 136° C. from hexanediol dipropionate and propionamide;
Dibutyrylhexamethylenediamine of the melting point 145° C. from hexanediol dibutyrate and butyramide;
Diisobutyrylhexamethylenediamine of the melting point 168° C. from hexanediol diisobutyrate and isobutyramide; and
Di-(α-ethylhexanoyl)-hexamethylenediamine of the melting point 130° C. from di-(α-ethylhexanoic acid) hexanediol ester and ethylhexanoic acid amide.

*Example 2*

50 parts of hexanediol-(1,6) is heated with 400 parts of acetamide, 50 parts of ammonia and 40 parts of water for 10 hours in a pressure vessel at 300° C., a pressure of 110 atmospheres being set up. The acetamide is distilled off, and the residue recrystallized from ethyl acetate. 73.5 parts of N,N'-diacetylhexamethylenediamine-(1,6) is obtained. This is a yield of 87.0% of the theory.

If the acetamide distilled off is made up again to 400 parts and reacted as described above with 40 parts of hexanediol-(1,6), 62.2 parts of diacetylhexamethylenediamine is obtained. This is a yield of 92% of the theory.

By fusing 20 parts of diacetylhexamethylenediamine with 16 parts of adipic acid at 210° to 220° C. while passing a stream of nitrogen through the melt, 11 parts of glacial acetic acid (92% of the theory) and 23 parts of polyamide 6-6 of the K-value 56 are obtained.

The following compounds are obtained in an analogous manner:

Diacetylethylenediamine-(1,2) of the melting point 175° C. from ethylene glycol and acetamide;
Diacetylpropylenediamine-(1,2) of the melting point 144° C. from propylene glycol-(1,2) and acetamide;
Diacetylbutylenediamine-(1,4) of the melting point 129° C. from butanediol-(1,4) and acetamide;
Dibenzoylhexamethylenediamine of the melting point 159° C. from hexanediol-(1,6) and benzamide;
Diacetyloctamethylenediamine of the melting point 127° C. from octanediol-(1,8) and acetamide;
Diacetylhexamethylenediamine of the melting point 127° C. from decanediol-(1,10) and acetamide;
Diacetylcyclohexamethylenediamine of the melting point 272° C. from cyclohexanediol-(1,2) and acetamide;
Acetylcyclohexylamine of the melting point 104° C. from cyclohexanol and acetamide; and
Acetanilide of the melting point 108° C. from phenol and acetamide.

*Example 3*

25 parts of hexanediol-(1,6), 400 parts of ammonium acetate and 130 parts of 30% aqueous ammonia are heated for 20 hours at 300° C. in a pressure vessel, a pressure of 100 atmospheres being set up. The acetamide formed is distilled off, and 40 parts of crude diacetylhexamethylenediamine-(1,6) is obtained. After distillation in vacuo, at a boiling point of 208° C. at 0.3 mm. Hg, the yield is 36.5 parts, which is equivalent to 86.3% of the theory.

If the ammonium acetate is replaced by 250 parts of benzoic acid, and 50 parts of ammonia and 20 parts of water are added, 53 parts of dibenzoylhexamethylenediamine-(1,6) (77% of the theory) is obtained when the same conditions are used.

*Example 4*

40 parts of hexanediol is reacted with 280 parts of acetonitrile and 185 parts of concentrated aqueous ammonia in a pressure vessel for 15 hours at 300° C. and 100 atmospheres. The acetamide formed is distilled off and the residue recrystallized. 56 parts of pure diacetylhexamethylenediamine is obtained. This is a yield of 82.5% of the theory.

*Example 5*

50 parts of hexanediol acetate, 177 parts of acetamide, 100 parts of xylene and 30 parts of ammonia are reacted in a pressure vessel for 15 hours at 300° C. and 110 atmospheres. After working up as described in Example 2, 25 parts of diacetylhexamethylenediamine is obtained. This is a yield of 50.4% of the theory.

*Example 6*

36 parts of n-butanol is reacted with an ammonia-saturated solution of 177 parts of acetamide in 69 parts of water in a pressure vessel for 15 hours at 300° C. and 95 atmospheres. The resulting melt is saponified for 8 hours with 140 parts of 50% caustic soda solution at 100° to 110° C., and 22 parts (61% of the theory) of butylamine is distilled off. The boiling point is 78° C., and the amine number 774 (theoretical value 768).

Butylamine-(2) of the boiling point 63° C. is obtained in an analogous manner from butanol-(2).

*Example 7*

37 parts of n-dodecanol (lauryl alcohol) is reacted with 370 parts of benzamide and 50 parts of ammonia for 15 hours in a pressure vessel at 300° C. and 125 atmospheres. The unchanged benzamide is distilled off and the residue recrystallized. 50 parts (87% of the theory) of benzoyldodecylamine of the melting point 63° C. and the boiling point 195° C. at 0.3 mm. Hg is obtained.

Benzoyltridecylamine of the boiling point 180° C. at 0.3 mm. Hg is obtained in an analogous manner from tridecanol obtained by oxidation of dodecene.

Example 8

The benzamide in Example 7 is replaced by the same amount of acetamide. 39 parts (90% of the theory) of acetyldodecylamine of the melting point 51° C. is obtained.

In an analogous manner, acetyltridecylamine is obtained as a thick oil boiling at 145° to 147° C. at 0.3 mm. Hg from tridecanol obtained by oxidation of dodecene, and acetylcyclohexylamine of the melting point 106° C. from cyclohexanol.

Example 9

12.2 parts of ethanolamine, 122 parts of acetamide and 30 parts of ammonia are heated in a pressure vessel for 15 hours at 280° C. After the excess acetamide has been distilled off, 19.3 parts (67% of the theory) of diacetylethylenediamine of the melting point 174° C. is obtained by recrystallization from acetone.

When diethanolamine is used instead of ethanolamine and benzamide instead of acetamide, tribenzoyldiethylenetriamine of the melting point 254° C. is obtained.

Glycol-(di-β-acetylaminoethyl) ether of the melting point 62° C. is obtained in an analogous manner from triglycol and acetamide.

Example 10

20 parts of glycerol (92%), 500 parts of acetamide, 40 parts of water and 50 parts of ammonia are reacted for 15 hours in a pressure vessel at 280° C. and 100 atmospheres. After the excess acetamide has been distilled off, 26 parts (60.5% of the theory) of 1,2,3-triacetylaminopropane of the melting point 202° C. crystallizes out from the residue.

If benzamide is used instead of acetamide, 1,2,3-tribenzoyltriaminopropane of the melting point 219° C. is obtained.

Example 11

24.4 parts of phenylethyl alcohol, 250 parts of acetamide, 50 parts of ammonia and 30 parts of water are heated for 15 hours at 300° C. in a pressure vessel. The excess acetamide is distilled off, and 19.5 parts (60% of the theory) of acetylphenylethylamine of the melting point 54° C. is obtained by recrystallization from ethyl acetate.

If 21.6 parts of benzyl alcohol is used instead of phenylethyl alcohol, acetylbenzylamine of the melting point 63° C. is obtained.

Example 12

10 parts of hexanediol-(1,6), 250 parts of hexahydrobenzamide, 30 parts of water and 30 parts of ammonia are heated for 10 hours at 300° C. in a pressure vessel. The excess hexahydrobenzamide is distilled off, and 15 parts (59% of the theory) of di-(hexahydrobenzoyl)-hexamethylenediamine-(1,6) of the melting point 192° C. is obtained.

If phenylacetamide is used instead of hexahydrobenzamide, di-(phenylacetyl)-hexamethylenediamine-(1,6) of the melting point 168° C. is obtained.

What I claim is:

1. A process for the production of N-mono-substituted acylamines which comprises: reacting at a temperature of between 200° and 400° C. and under a pressure between 20 and 250 atmospheres a hydroxy compound selected from the group consisting of monohydric primary alkanols with 1 to 20 carbon atoms, monohydric secondary alkanols with 3 to 8 carbon atoms, monohydric secondary cycloalkanols with 5 to 8 carbon atoms, monohydric primary aralkanols, dihydric diprimary, disecondary and primary secondary alkanols and cycloalkanols with 2 to 15 carbon atoms, trihydric and tetrahydric alkanols with primary, secondary and primary and secondary hydroxyl groups and 3 to 8 carbon atoms, aminoalkanols with primary hydroxyl groups and 2 to 8 carbon atoms, aliphatic ether alcohols with primary hydroxyl groups and 3 to 16 carbon atoms having a saturated hydrocarbon structure apart from the hydroxy group and ether bridge, and esters of said alcohols derived from a carboxylic acid selected from the group consisting of fatty acids with 2 to 20 carbon atoms, benzene monocarboxylic acids, cycloalkane monocarboxylic acids and benzene fatty acids with ammonia and a carboxylic acid amide selected from the group consisting of fatty acid amides with 2 to 10 carbon atoms, amides of benzene monocarboxylic acids, amides of cycloalkane monocarboxylic acids with 6 to 8 carbon atoms and amides of benzene fatty acids.

2. A process as claimed in claim 1 wherein the carboxylic acid amide is produced in situ from a compound from the group consisting of ammonium salts, nitriles and esters of carboxylic acids, said esters being derived from alkanols having 1 to 4 carbon atoms.

3. A process as claimed in claim 1 wherein the ammonia is used in a molar excess of 1 to 10 times with reference to the hydroxyl and ester groups to be converted.

4. A process as claimed in claim 1 wherein the carboxylic acid amide is used in a molar excess of 5 to 15 times with reference to the hydroxyl and ester groups to be converted.

5. A process as claimed in claim 1 wherein the temperature is between 250° C. and 370° C.

6. A process as claimed in claim 1 wherein the reaction is carried out at a pressure between 80 and 200 atmospheres.

References Cited in the file of this patent

Bergmann: The Chemistry of Acetylene and Related Compounds, page 80 (1948).